(12) United States Patent
Barker (10) Patent No.: US 7,823,835 B2
(45) Date of Patent: Nov. 2, 2010

(54) DOOR POD ASSEMBLY (75) Inventor: David N Barker, San Diego, CA (US)

(73) Assignee: Apical Industries, Inc., Oceanside, CA (US)

( * ) Notice: Subject to any disclaimer, the term of this patent is extended or adjusted under 35 U.S.C. 154(b) by 668 days.

(21) Appl. No.: 11/710,037

(22) Filed: Feb. 22, 2007

(65) Prior Publication Data

US 2007/0199188 A1  Aug. 30, 2007

(51) Int. Cl.
- B64C 1/14 (2006.01)
- B64D 25/14 (2006.01)
- B64D 25/16 (2006.01)
- B64D 25/18 (2006.01)

(52) U.S. Cl. .................. 244/129.5; 244/107; 244/905; 441/80

(58) Field of Classification Search .................. 244/905, 244/129.5, 129.4, 137.2, 107, 100 A, 118.1; 49/70; 193/25 B; 441/42, 80, 83, 125; 182/48; 128/206.27
See application file for complete search history.

(56) References Cited

U.S. PATENT DOCUMENTS

| | | |
|---|---|---|
| 1,776,865 A | 9/1930 | Salisbury |
| 2,264,321 A | 12/1941 | Manson |
| 2,934,293 A * | 4/1960 | Boehme .................. 244/118.5 |
| 3,503,394 A * | 3/1970 | Hotz et al. ............. 128/206.27 |
| 3,536,070 A * | 10/1970 | Bovard .................. 128/202.26 |
| 3,771,749 A * | 11/1973 | Smialowicz ............. 244/137.2 |
| 4,909,247 A * | 3/1990 | Terrisse et al. ......... 128/206.27 |
| 5,102,070 A | 4/1992 | Smialowicz et al. ..... 244/137.2 |
| 5,342,230 A * | 8/1994 | Louis .......................... 441/42 |
| 5,895,354 A * | 4/1999 | Simmons .................... 128/903 |
| 5,931,415 A * | 8/1999 | Lingard et al. ........... 244/129.5 |
| 6,318,364 B1 * | 11/2001 | Ford et al. ............. 128/204.29 |
| 6,457,677 B2 * | 10/2002 | Dazet et al. .............. 244/137.2 |
| 7,380,755 B2 * | 6/2008 | Matsch ..................... 244/137.2 |

* cited by examiner

Primary Examiner—Tien Dinh
Assistant Examiner—Richard R Green
(74) Attorney, Agent, or Firm—Peter K. Hahn; Luce, Forward, Hamilton & Scripps, LLP (57) ABSTRACT

A door pod assembly includes a housing that defines a cavity for emergency equipment, a pod door, and a latch retaining the pod door in a closed position relative to the housing. The assembly is configured such that the latches, upon activation free the release door thereby exposing the emergency equipment and allowing it to be deployed. The door pod assembly maybe coupled to an interior surface of a baggage compartment door and is configured so that the baggage compartment may continue to be used for its originally intended purpose.

20 Claims, 8 Drawing Sheets

DOOR POD ASSEMBLY

FIELD OF THE INVENTION

The present invention is generally directed to compartments for storing emergency equipment, and more specifically to an assembly that maybe coupled to an aircraft door that includes a compartment for storing emergency equipment and a compartment door that allows storage and deployment of the emergency equipment without impairment of the use of the aircraft door.

BACKGROUND OF THE INVENTION

Emergency flotation devices are required on many aircraft to provide emergency assistance to passengers in the event the aircraft experiences an emergency situation and is forced down in water. Emergency flotation devices generally include systems designed to float the aircraft, systems for emergency life rafts and systems for life vests for individual occupants.

One example of an airplane flotation system is shown in U.S. Pat. No. 1,776,865. The system includes inflatable bags located in a forward portion of an airplane and is manually operated by a pilot. The bags are stored in a non-inflated state within closed compartments. The system utilizes pressure cylinders to sequentially unlock doors of the compartments and inflate the inflatable bags. During operation the pilot activates the pressure cylinder by releasing pressurized gas. After inflation, the pilot is required to pull a cord that places the pressure cylinder into an intermediate position to block further fluid flow between the pressurized cylinder and the inflatable bags. A first disadvantage of the system is that it does not provide for a valve that remains closed until a predetermined pressure is applied. As a result, any increase in pressure may cause the doors to unlock and the inflatable bags to inflate even when undesired. Another disadvantage is that it requires manual operation by the pilot even after the initial activation of the system.

U.S. Pat. No. 2,264,321 to Manson, describes a life-saving device that includes an inflatable life raft that is arranged in a compartment on the side of a vehicle such as an airplane. The compartment is closed by a pair of hinged doors that are spring-loaded to urge them into an opened position. The doors are held closed by pins that extend through meshing lugs that are included on the doors. A pull cord is secured to the pins and a valve on an inflating-gas container so that pulling on the cord sequentially removes the pins from the lugs and operates the valve to permit the flow of gas from the container to the raft. The cord fully disengages from the gas container after the valve is operated. A first disadvantage of the system is that the pins may be disengaged without a complete activation of the system. In addition, the pull cord may become bound which may result in the pin disengaging without activation of the gas container. A further disadvantage is that the gas container valve does not include a mechanism to close the gas path between the gas container and the raft after the raft is inflated.

In view of the above, there exists a need for a storage and release system for emergency equipment that provides secure storage of the emergency equipment and positive deployment of the emergency equipment. There is also a need for a system that can be installed during manufacture of the aircraft, or as an aftermarket installation. It is important that the system provide little or no impairment of the standard equipment and components of the aircraft.

SUMMARY OF THE INVENTION

In view of the foregoing, it is an object of the present invention to provide a storage and release system for emergency equipment that provides secure storage and positive deployment of the emergency equipment.

It is another object of the invention to provide a system that can be installed during manufacture of the aircraft, or as an aftermarket installation.

It is another object of the invention to provide a system that produces little or no impairment of the standard equipment and components of the aircraft.

A door pod assembly in accordance with the present invention includes a housing defining a cavity, a pod door, emergency equipment disposed within the cavity and a latch. The pod door is configured to move between a closed position in which the pod door covers the cavity and an opened position wherein the cavity is exposed. The pod door may be pivotally coupled to either the housing or a compartment door of the aircraft.

The emergency equipment disposed in the cavity preferably includes at least one inflatable body. Additional emergency supplies may also be included in the cavity and configured to deploy with an inflatable body. For example, the emergency equipment may include an emergency beacon, emergency rations and first aid kits.

The latch is configured to selectively retain the pod door in the closed position. The latch may be coupled to the housing or it may be coupled directly to a compartment door of an aircraft. It should be appreciated that any number of latches may be utilized.

These and other features and advantages of the present invention will be appreciated from review of the following detailed description of the invention, along with the accompanying figures in which like reference numerals refer to like parts throughout.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
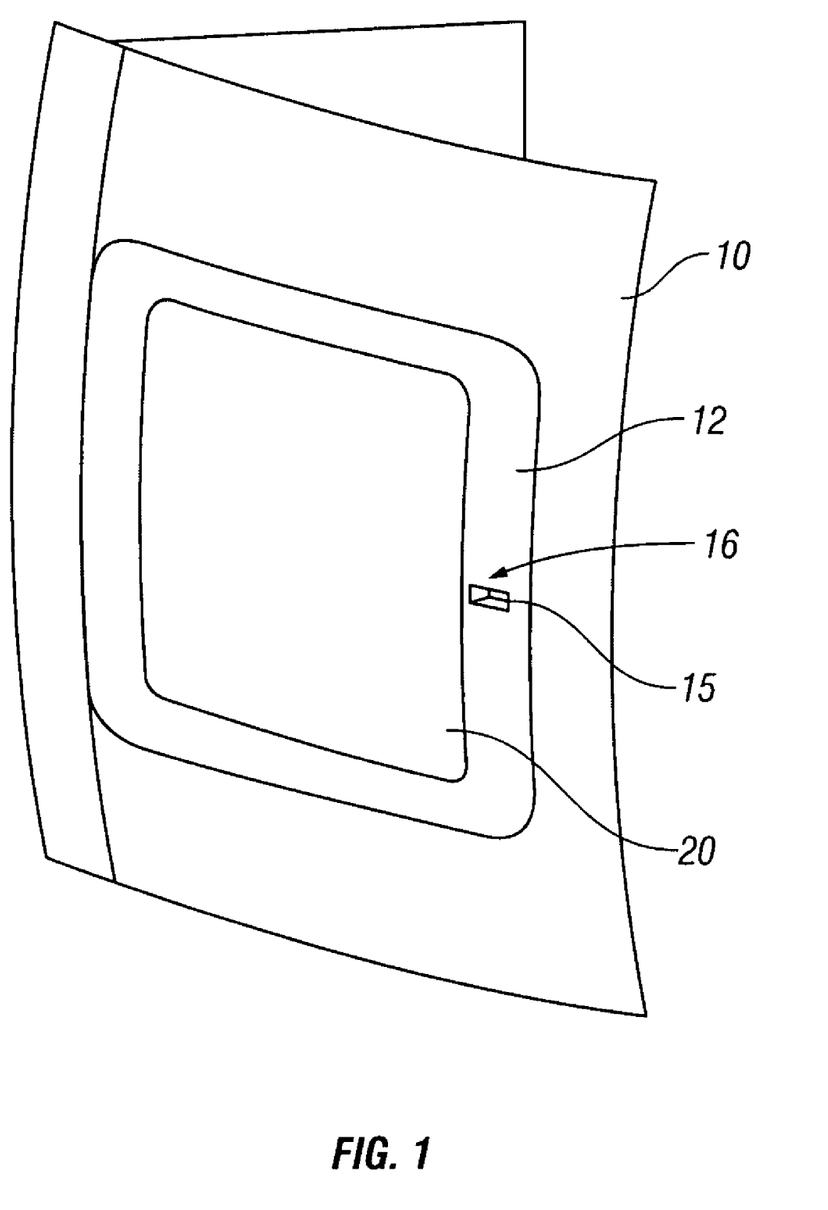
FIG. 1 is a perspective view of a side panel of an aircraft having a baggage compartment door that incorporates an embodiment of a door pod assembly in accordance with the present invention.
Figure 2:
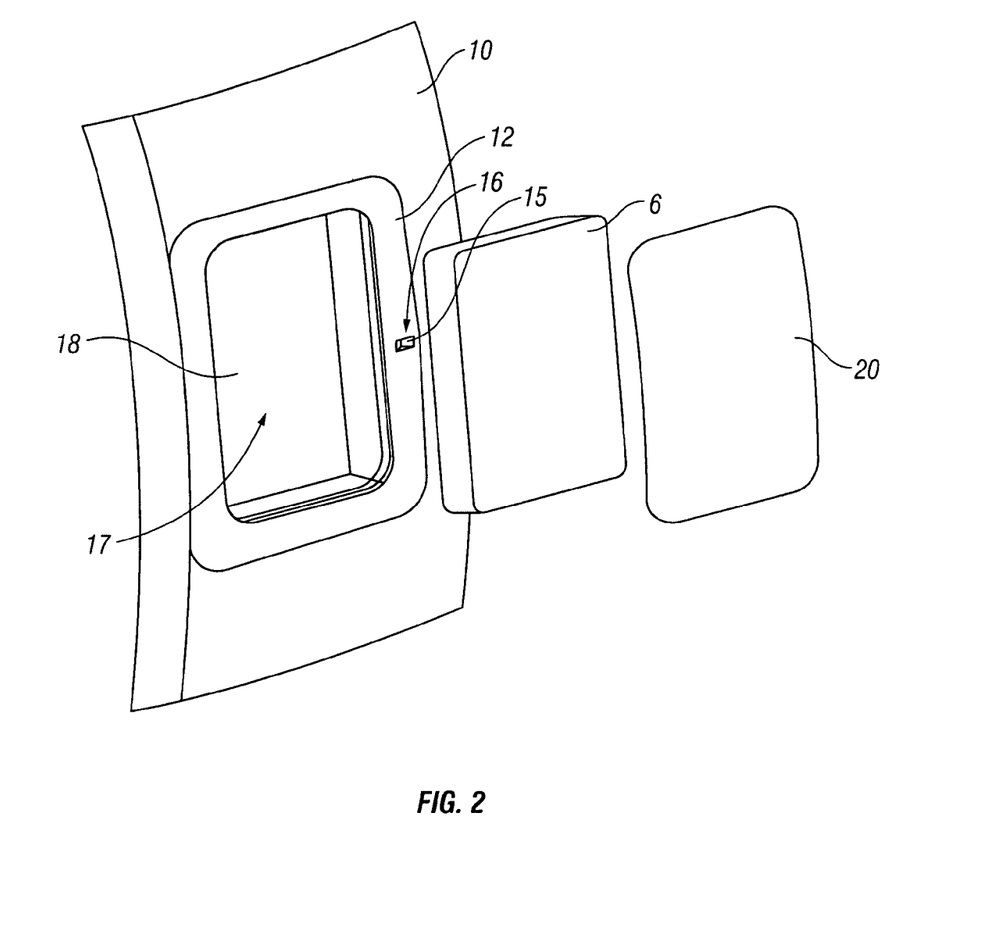
FIG. 2 is a partially exploded view of the baggage compartment door and door pod assembly of FIG. 1.
Figure 3:
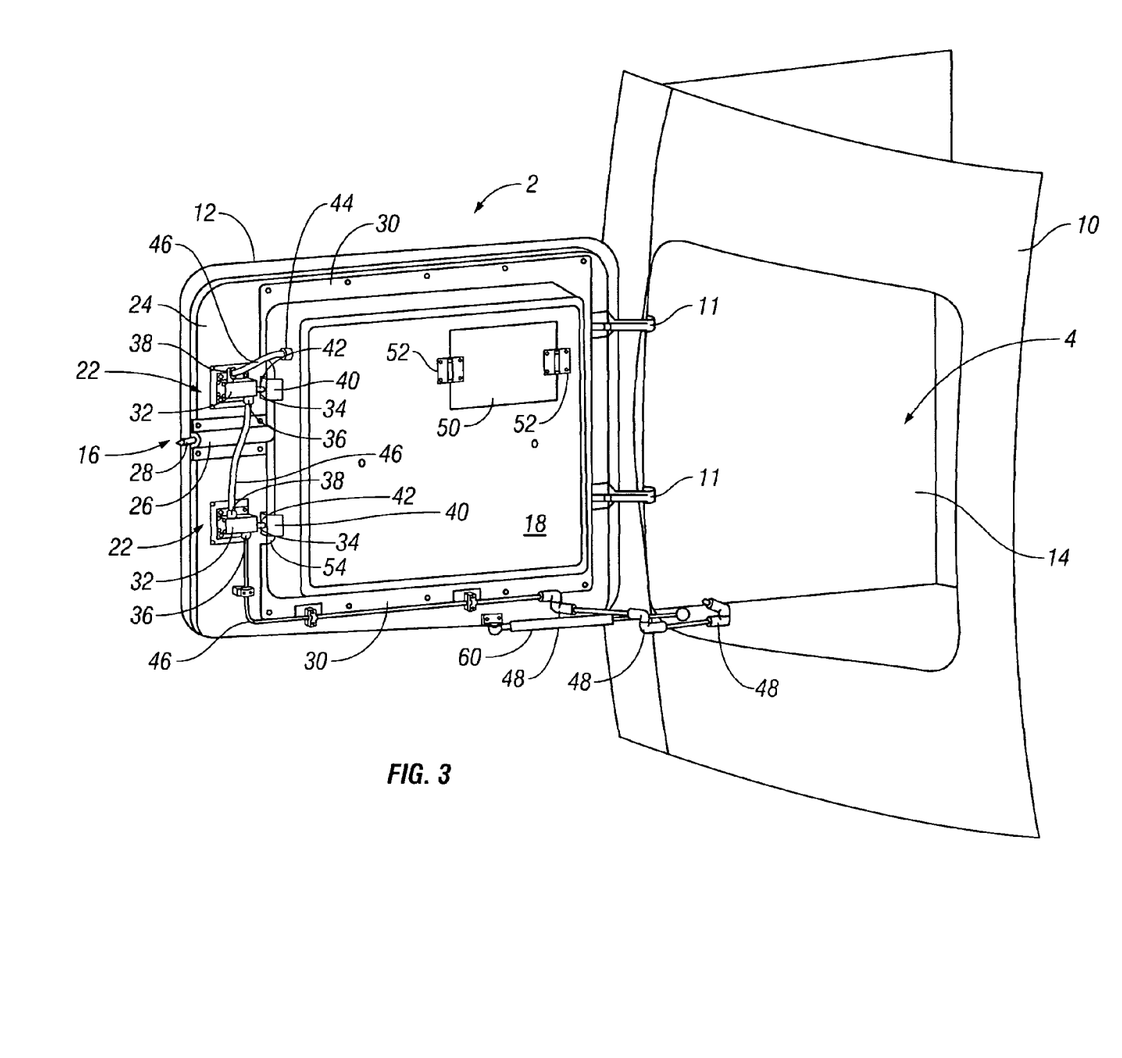
FIG. 3 is a perspective view the side panel of FIG. 1 with the baggage compartment door in an opened configuration.

Referring first to FIGS. 1-3, an embodiment of a door pod assembly will be described. In the present embodiment, door pod assembly 2 is incorporated into baggage compartment 4 and is included in side panel 10 on the fuselage of an aircraft, such as a helicopter. Baggage compartment 4 includes compartment door 12 that provides access to an interior space 14 of baggage compartment 4. Compartment door 12 is hinged on side panel 10 by a plurality of hinge members 11. In the present embodiment, door pod assembly 2 is incorporated into compartment door 12 so that door pod assembly 2 is easily accessible for installation and maintenance.

In a preferred embodiment, emergency equipment included in door pod assembly 2 includes an inflatable body 6 that is contained in a cavity 17 defined by the interior of housing 18. Inflatable body 6 may be a life raft, a personal floatation device or an aircraft flotation device. It should be appreciated that any number of inflatable bodies 6 may be included in the emergency equipment stored in cavity 17. It should also be appreciated that other emergency equipment may be stored with inflatable body 6. For example, emergency equipment such as a first aid kit and/or emergency beacon may be included with or coupled to a life raft so that after deployment, the emergency equipment is accessible to passengers utilizing the life raft. As further examples, the emergency equipment may include life vests, emergency rations, flares, etc.

Compartment door 12 is pivotally coupled to side panel 10 so that it may be rotated between closed and open positions. Latch control 15 is disposed on compartment door 12 so it is accessible from the exterior of door 12. Latch control 15 is configured so that a user may operate latch mechanism 16 to selectively secure door 12 in the closed position, as shown in FIG. 1.

A door pod aperture extends through compartment door 12 and provides access to the interior of housing 18 and cavity 17 from the exterior of compartment door 12. As a result of the door pod aperture, the remaining portions of compartment door 12 generally form a frame that supports pod door 20. In the present embodiment, the peripheral shape of compartment door 12 and the shape of the door pod aperture are generally rectangular so that compartment door 12 is generally shaped as a rectangular frame.

Pod door 20 is pivotally coupled to compartment door 12 along one edge and is configured to pivot between a closed position, in which pod door 20 encloses cavity 17 and an opened position, in which cavity 17 is accessible from the exterior of compartment door 12. When closed, pod door 20 is preferably recessed within the pod aperture so that the outer surface of pod door 20 is flush with an outer surface of compartment door 12. Compartment door 12 may include a recessed shoulder adjacent the pod aperture that provides a stop and a sealing surface for pod door 20.

Referring now to FIG. 3, latch mechanism 16 is coupled to an interior surface 24 of compartment door 12. Latch mechanism 16 generally includes housing 26 and latch pin 28. Latch pin 28 extends from housing 26 and is slidably coupled therein. Latch pin 28 is configured to engage a mating feature included on side panel 10. For example, latch pin 28 may be a cylindrical pin, as shown, that is inserted into an aperture included in side panel 10 when compartment door 12 is closed and latch mechanism 16 is in a locked configuration. It should be appreciated that any latching mechanism may be used.

Housing 18 is also coupled to interior surface 24 of compartment door 12. Housing 18 is generally concave and is sized so that it defines a sufficient volume to store inflatable body 6 and any other desired emergency equipment. Mounting flange 30 of housing 18 is coupled to interior surface 24 adjacent the pod aperture. Housing 18 is oriented so that its concave interior is accessible through the pod aperture when pod door 20 is in the opened position.

Figure 4:
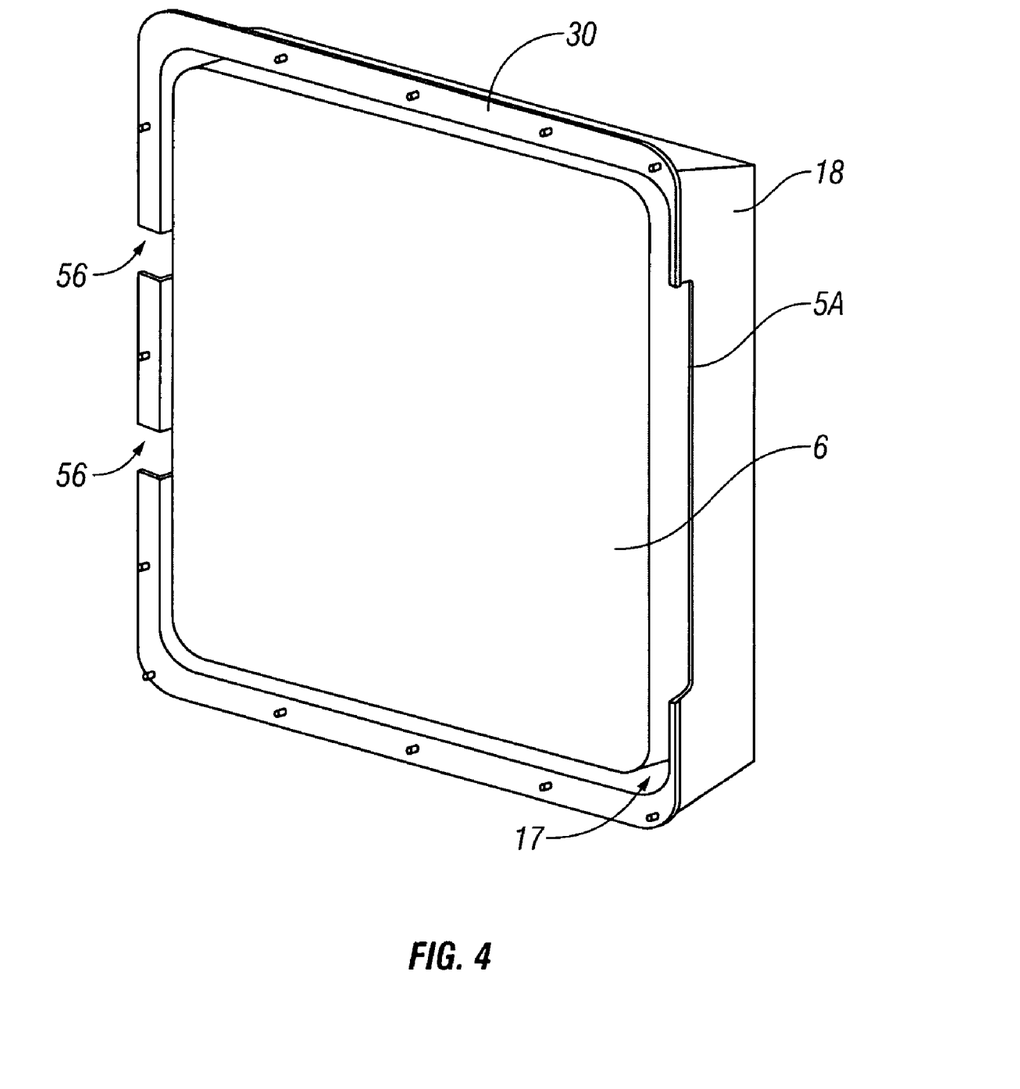
FIG. 4 is a perspective view of a portion of a door pod assembly in accordance with the present invention.

Housing 18 also includes a pod door release slot 54 to provide clearance for lock tabs 40 to extend from pod door 20 adjacent the exterior surface of housing 18 so that the tabs may be engaged by latch pins 34. The size and/or number of slots 54 may be selected to correspond to a desired configuration of latches 22. For example, as shown in FIGS. 3 and 4 a single elongate release slot 54 is provided in housing 18 that provides clearance for a pair of lock tabs.

Figure 5:
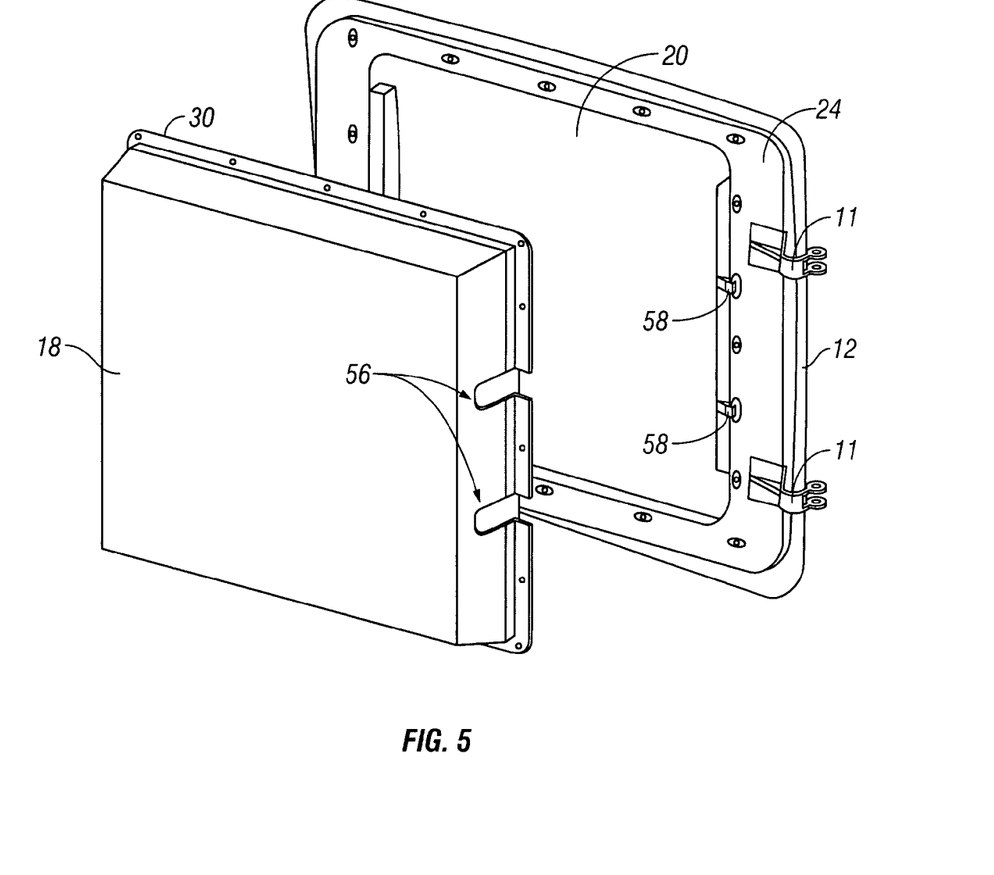
FIG. 5 is a partially exploded view of the interior side of the baggage compartment door and door pod assembly of FIG. 1.

Hinge members 58, shown in FIG. 5, provide a pivoting connection between pod door 20 and compartment door 12. Pod door hinge slots 56 are provided on housing 18. Slots 56 extend through a side wall of housing 18 opposite the side of housing 18 that includes slot 54. Slots 56 provide clearance for hinge members 58 to extend between pod door 20 and compartment door 12.

Preferably, releasable fasteners, such as screws, couple mounting flange 30 to compartment door 12 so that pod assembly may be easily installed and/or removed. It will be appreciated that housing 18 may alternatively be permanently coupled to compartment door 12 if desired, such as by welding. In a further alternative, housing 18 may be incorporated into door 12 by forming a concave portion in door 12, such as by stamping or molding the door panel.

As a further alternative, pod door 20 may be pivotally coupled directly to housing 18, rather than compartment door 12. In such an embodiment, pod door 20 and housing 18 may be installed as a unit into a pod aperture included in a compartment door. It should be appreciated that in such an embodiment, inflatable body 6 may be prepackaged in the assembled door pod 20 and housing 18 and pod door 20 may be held closed with temporary fasteners. As a result, the combined housing 18, door pod 20 and packed inflatable body 6 may be supplied as an easily replaceable unit.

In the assembled door pod assembly 2, latches 22 retain pod door 20 in the closed position, as shown in FIG. 3, and may be triggered to selectively release pod door 20, such as for emergency deployment of an inflatable body 6. In the present embodiment, latches 22 are pneumatically triggered and each of latches 22 generally includes housing 32, latch pin 34, fluid inlet 36 and fluid outlet 38. Housings 32 are mounted on interior surface 24 of compartment door 12 adjacent housing 18.

Latch pin 34 is slidably coupled in housing 32 so that it may move between an extended locked position and a retracted released position. A lock tab 40 extends toward the interior of the baggage compartment from an interior surface of pod door 20 and includes lock aperture 42 that is configured to receive latch pin 34 when latch pin is in the locked position. Engagement between latch pin 34 and lock tab 40 prevents relative motion between pod door 20 and compartment door 12.

Fluid inlet 36 and fluid outlet 38 are located on housing 32 so that when fluid is injected into inlet 36 it first causes latch pin 34 to retract. After latch pin 34 is retracted, the fluid is able to flow out of housing 32 through outlet 38. Latches 22 are fluidly coupled in series so that after the fluid exits the first latch 22 it enters inlet 36 of the second latch and the sequence is repeated. After the fluid exits outlet 36 of the second latch 22 it flows into fluid inlet 44 of housing 18 which is fluidly coupled to an inflation inlet (not shown) included on inflatable body 6. That configuration assures that pod door 20 is released prior to the inflation of inflatable body 6. An example of a suitable latch is described in co-pending U.S. patent application Ser. No. 11/361,821 entitled "Pressure Activated Latch and filed on Feb. 24, 2006, the disclosure of which is incorporated in its entirety by reference herein. Preferably latches 22 are pneumatically activated, but it should be appreciated that latches 22 may be electrical, hydraulic or manually controlled. Furthermore, latches 22 may be triggered manually or automatically, such as by an environmental condition or other stimulus, such as a mechanical shock or contact with water.

Fluid is supplied to latches 22 through a series of fluid conduits 46 from a fluid source (not shown), such as a pressurized fluid reservoir. Preferably, the fluid source is disposed within the aircraft in the proximity of pod assembly 2, but it should be appreciated that the fluid source may be located anywhere within or on the aircraft. Fluid conduits 46 may include rigid and/or flexible sections. As shown, fluid conduits 46 extending between the fluid source and inlet 34 of the first latch 22 are rigid and fluid conduits 46 extending between latches 22 and between the second latch 22 and inflatable body 6 are flexible.

In embodiments utilizing a fluid source that is disposed within a portion of the aircraft that is stationary relative to compartment door 12, fluid conduits 46 are required to extend across a hinged joint. In the present embodiment, a hose hinge assembly is used to span the joint that incorporates rigid fluid conduits 46 that are coupled by elbows 48 capable of rotating relative to each other. The hose hinge assembly assures that fluid conduits 46 are maintained in a proper orientation during opening and closing of compartment door 12 so that the normal function of baggage compartment may be maintained. An example of a suitable hose hinge assembly is described in co-pending U.S. patent application Ser. No. 11/641,993 entitled "Hose Hinge Assembly" and filed on Dec. 18, 2006, the disclosure of which is incorporated in its entirety by reference herein. It should be appreciated that a flexible fluid conduit 46 may be used in lieu, or in addition to, a hose hinge assembly as shown and additional supports may be provided to assure the proper orientation of the flexible conduit during opening and closing of the compartment door.

An inspection door 50 is preferably included in housing 18. Inspection door 50 is a door that may be removed to perform inspection of the contents of housing 18. Inspection door 50 is hinged or removably coupled to housing 18, with connectors 52, so that it covers an aperture that extends through the wall of housing 18. Inspection door 50 may be removable if desired. The size and position of inspection door 50 maybe selected so that any portion of the contents of housing 18 may be inspected and/or maintained.

Although in the present embodiment, latches 22 and fluid conduits 46 are exposed to the interior of baggage compartment 4, it should be appreciated that housing 18 may include a second cavity configured to cover latches 22 and a portion of fluid conduits 46. An access door, similar to inspection door 50 may be included on the second cavity so that the components in the second cavity may be accessed for inspection and/or maintenance. Alternatively, a separate cover, or housing, may be provided to cover those components.

A door closer 60 may also be provided that is coupled to compartment door 12 and the interior of baggage compartment 14. Door closer 60 is configured to urge compartment door 12 into a closed configuration. Any type of door closer, such as a gas cylinder, may be utilized.

Figure 6:
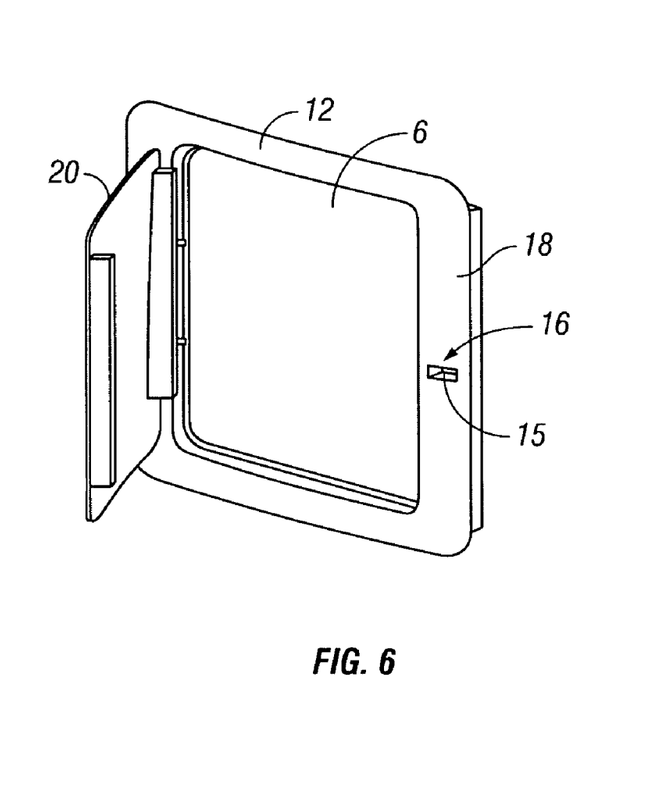
FIG. 6 is a perspective view of a first stage of deployment of emergency equipment included in the door pod assembly of the present invention.
Figure 7:
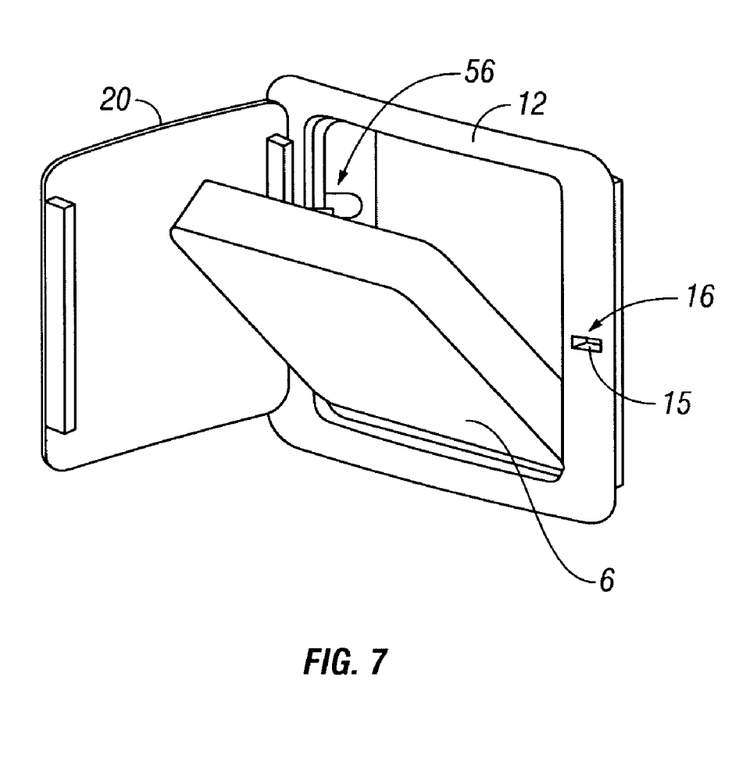
FIG. 7 is a perspective view of a second stage of deployment of emergency equipment included in the door pod assembly of the present invention.

Deployment of emergency inflatable equipment is preferably a two stage process. First, responsive to an emergency event, latches 22 are released which releases pod door 20. As a result, pod door 20 is free to swing to the opened position, as shown in FIG. 6. After latches 22 are released, inflatable body 6 is inflated and deployed, as shown in FIG. 7. As described above, latches 22 may be configured so that they dictate the sequence of unlatching of latches 22 and inflation of inflatable body 6. Alternatively, a separate inflation valve may be utilized that is opened after latches are released. Preferably, inflatable body 6 is packed and stored so that during inflation it is predisposed to eject outward from cavity 17.

Figure 8:
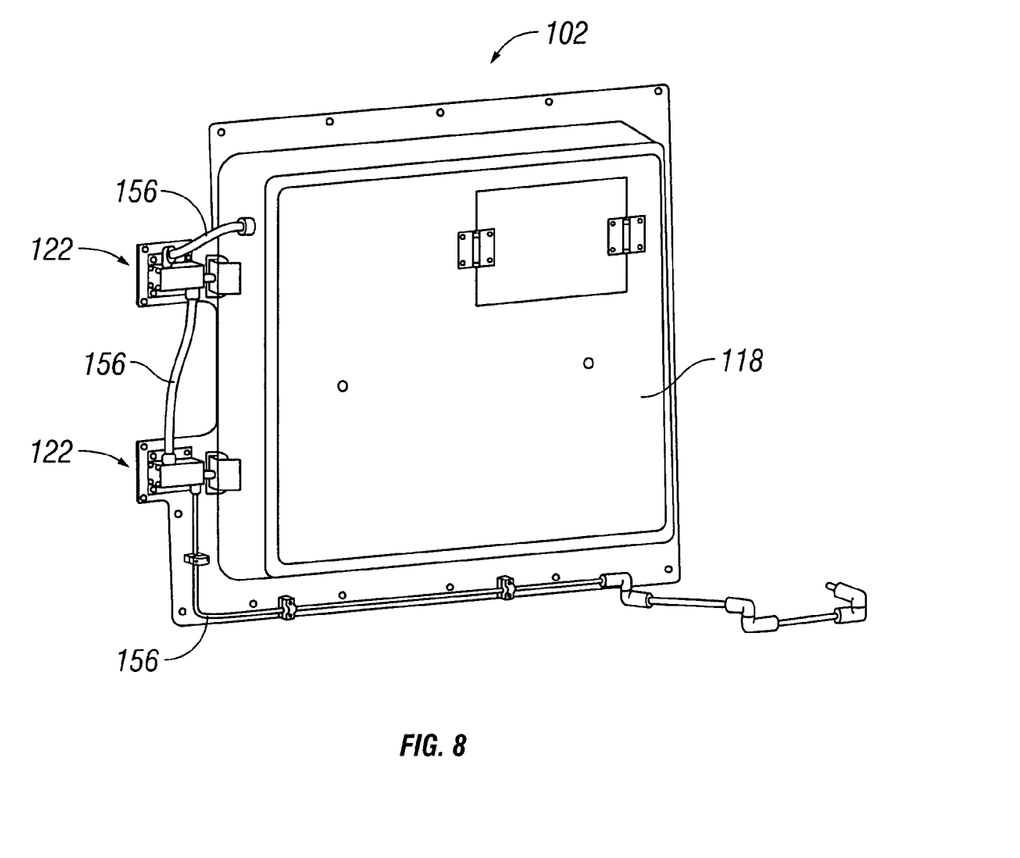
FIG. 8 is a perspective view of another embodiment of a door pod assembly.
Figure 9:
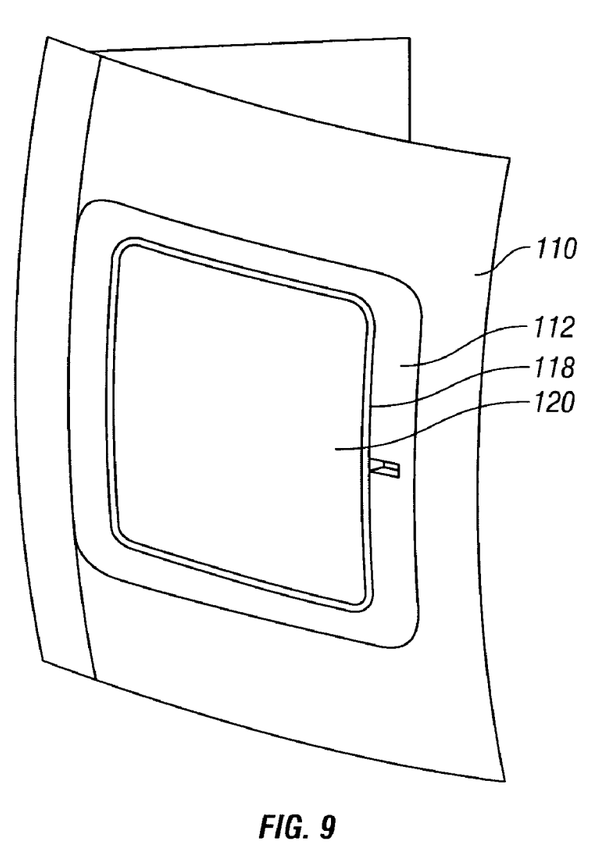
FIG. 9 is a perspective view of a side panel of an aircraft incorporating the door pod assembly of FIG. 8.

In another embodiment, shown in FIGS. 8 and 9, the door pod assembly 102 is configured as a self-contained unit. It should be appreciated that the present embodiment includes many of the features described above with respect to the previous embodiment. Door pod assembly 102 is configured so that it is installed on an aircraft in a two-step process. First housing 118 is coupled to an interior surface of a compartment door. Second, a fluid supply line is coupled to fluid conduits 156 adjacent the hose hinge assembly.

In this embodiment, a portion of housing 118 surrounding pod door 120 extends into the door pod aperture of compartment door 112 and provides a frame for pod door 120, as shown in FIG. 9. As a result a portion of the exterior surface of housing 118 and the exterior surface of pod door 120 are flush with the exterior surface of side panel 110. Furthermore, pod door 120 is hinged directly with housing 118 and seats against a shoulder provided on the interior of housing 118.

Housing 118 also includes mounting portions for latches 122 and fluid conduits 156. As a result, the emergency equipment may be pre-loaded into the cavity defined by housing 118, latches 122 may be mounted on housing 118 and pod door 120 may be coupled to housing 118, placed in a closed position and latched prior to installation of pod assembly 102 on an aircraft.

While embodiments of the invention have been described above, it will be apparent to one skilled in the art that various changes and modifications may be made.

What is claimed is:

1. A door pod assembly for mounting to a baggage compartment door of an aircraft having an interior side and an exterior side, comprising:

a housing defining a cavity, wherein the housing is mountable on and severable from the compartment door;

a pod door pivotally coupled to the compartment door and configured so that it encloses the cavity when said housing is mounted on said compartment door and said pod door is in a closed position;

emergency equipment disposed in the cavity and including at least one inflatable body; and a latch configured to selectively retain the pod door in a closed configuration relative to the compartment door, wherein the pod door is configured to open to the exterior of the aircraft such that the cavity is accessible from the exterior of the aircraft.

2. The door pod assembly of claim 1, wherein the housing includes a mounting flange that is configured to be coupled to an interior surface of the compartment door.

3. The door pod assembly of claim 1, wherein the pod door is configured to fit inside a door pod aperture included in the compartment door.

4. The door pod assembly of claim 1, wherein the pod door includes a lock tab that extends from an interior surface of the pod door.

5. The door pod assembly of claim 4, wherein the latch includes a lock pin that engages an aperture in the lock tab when the pod door is in the closed position.

6. The door pod assembly of claim 1, wherein the latch is pneumatic.

7. The door pod assembly of claim 6, further comprising a fluid conduit configured to extend between a fluid source and the latch.

8. The door pod assembly of claim 7, wherein the latch includes a lock pin and a portion of the lock pin blocks fluid communication between a fluid inlet and a fluid outlet of the latch when the latch is configured to retain the pod door in the closed position.

9. The door pod assembly of claim 8, further comprising a fluid conduit that extends from the outlet of the latch to an inlet of the inflatable body.

10. The door pod assembly of claim 1, further comprising an inspection door that is movably coupled to the housing, wherein the inspection door is configured to close an inspection aperture that extends through the housing when the inspection door is in a closed position.

11. A door pod assembly comprising:
    a housing defining a cavity;
    a pod door pivotally mounted to the housing, wherein the pod door is configured to move between a closed position in which the pod door covers the cavity and an opened position wherein the cavity is exposed;
    emergency equipment disposed in the cavity and including at least one inflatable body;
    a latch configured to selectively retain the pod door in the closed position, wherein the latch is coupled to the housing;
    wherein said door pod assembly is configured to be cooperatively engaged with a compartment door of an aircraft having an interior side and an exterior side; and
    said pod door is configured to open to the exterior of the aircraft such that the cavity is accessible from the exterior of the aircraft.

12. The door pod assembly of claim 11, wherein the housing includes a mounting flange that is configured to be coupled to an interior surface of an aircraft compartment door.

13. The door pod assembly of claim 12, wherein the pod door is configured to fit within a portion of the housing that extends from the mounting flange away from the cavity.

14. The door pod assembly of claim 11, wherein the latch is pneumatic.

15. The door pod assembly of claim 14, further comprising a fluid conduit configured to extend between a fluid source and the latch, wherein a portion of the fluid conduit is coupled to the housing.

16. The door pod assembly of claim 15, further comprising a hose hinge assembly that forms a portion of the fluid conduit.

17. A door pod assembly for use with a compartment door of an aircraft having an interior side and an exterior side, comprising:
    a housing defining a cavity wherein said housing cooperatively engages the baggage compartment door;
    a pod door pivotally coupled to the compartment door and sized to enclose the cavity when the housing is cooperatively engaged with the pod door and the pod door is in a closed position;
    wherein the pod door is configured to open to the exterior of the aircraft such that the cavity is accessible from the exterior of the aircraft;
    emergency equipment disposed in the cavity and including at least one inflatable body; and
    a latch configured to selectively retain the pod door in a closed configuration relative to the compartment door.

18. The door pod assembly of claim 17, further comprising a fluid conduit configured to extend between a fluid source and the latch, wherein a portion of the fluid conduit is coupled to the housing;
    wherein the latch includes a lock pin and a portion of the lock pin blocks fluid communication between a fluid inlet and a fluid outlet of the latch when the latch is configured to retain the pod door in the closed position.

19. The door pod assembly of claim 18, further comprising a fluid conduit that extends from the outlet of the latch to an inlet of the inflatable body.

20. The door pod assembly of claim 17, further comprising an inspection door that is movably coupled to the housing, wherein the inspection door is configured to close an inspection aperture that extends through the housing when the inspection door is in a closed position.

* * * * *

UNITED STATES PATENT AND TRADEMARK OFFICE
CERTIFICATE OF CORRECTION

| | | |
|---|---|---|
| PATENT NO. | : 7,823,835 B2 | Page 1 of 1 |
| APPLICATION NO. | : 11/710037 | |
| DATED | : November 2, 2010 | |
| INVENTOR(S) | : David N. Barker | |

It is certified that error appears in the above-identified patent and that said Letters Patent is hereby corrected as shown below:

On the title page insert item (60):

-- Related U.S. Application Data (60) Provisional application No. 60/776,349, filed on February 24, 2006. --

Signed and Sealed this
Twenty-eighth Day of December, 2010

David J. Kappos
*Director of the United States Patent and Trademark Office*